(12) United States Patent
Hao et al.

(10) Patent No.: US 12,163,102 B2
(45) Date of Patent: Dec. 10, 2024

(54) METHOD FOR RAPIDLY PREPARING BIODIESEL UNDER LOW TEMPERATURES

(71) Applicant: Inner Mongolia Agricultural University, Hohhot (CN)

(72) Inventors: Yinan Hao, Hohhot (CN); Jingwen Wang, Hohhot (CN); Zhenlin Liu, Hohhot (CN); Shuo Wang, Hohhot (CN); Jian Sheng, Hohhot (CN); Kai Zhang, Hohhot (CN); Hao Ren, Hohhot (CN); Juntao Gong, Hohhot (CN); Yan Wang, Hohhot (CN); Lihong Yao, Hohhot (CN); Ximing Wang, Hohhot (CN)

(73) Assignee: Inner Mongolia Agricultural University, Hohhot (CN)

( * ) Notice: Subject to any disclaimer, the term of this patent is extended or adjusted under 35 U.S.C. 154(b) by 0 days.

(21) Appl. No.: 18/107,068

(22) Filed: Feb. 8, 2023

(65) Prior Publication Data
US 2023/0340346 A1  Oct. 26, 2023

(30) Foreign Application Priority Data
Apr. 24, 2022 (CN) .......................... 202210433337.6

(51) Int. Cl.
C10L 1/02 (2006.01)
C11C 3/10 (2006.01)

(52) U.S. Cl.
CPC ................ C10L 1/026 (2013.01); C11C 3/10 (2013.01); C10L 2200/0476 (2013.01)

(58) Field of Classification Search
CPC ..... C10L 1/026; C10L 2200/0476; C11C 3/10
See application file for complete search history.

(56) References Cited

U.S. PATENT DOCUMENTS

| 9,303,233 B2 * | 4/2016 | Kovács ................... C10L 1/026 |
| 2009/0165366 A1 * | 7/2009 | Jovanovic ............ B01J 19/0093 44/388 |

FOREIGN PATENT DOCUMENTS

| CN | 1858159 A | 11/2006 |
| CN | 1891786 A | 1/2007 |
| CN | 101302433 A | 11/2008 |
| CN | 101717698 A | 6/2010 |

(Continued)

OTHER PUBLICATIONS

English-language machine translation of CN 108456559A (Year: 2018).*

(Continued)

Primary Examiner — James C Goloboy

(57) ABSTRACT

Disclosed is a method for rapidly preparing biodiesel at low temperatures, belonging to the technical field of chemical energy. The method includes the following steps: adding alkali catalyst, alcohol and organic solvent into grease, and obtaining the biodiesel through transesterification. The transesterification is carried out with the addition of organic solvent, including petroleum ether or n-hexane to improve the compatibility between the two phases of alcohol and grease, increase contact area between the two phases of alcohol and grease, reduce mass transfer resistance between the two phases of alcohol and grease, and promote the grease molecules to enter the methanol solution and dissolving of oil in the grease.

7 Claims, 1 Drawing Sheet

(56) References Cited

FOREIGN PATENT DOCUMENTS

| | | | |
|---|---|---|---|
| CN | 101768518 A | | 7/2010 |
| CN | 102296000 A | | 12/2011 |
| CN | 103571546 A | * | 2/2014 |
| CN | 104327888 A | | 2/2015 |
| CN | 108456559 A | * | 8/2018 |
| WO | WO-2013156953 A1 | * | 10/2023 .............. C10L 1/026 |

OTHER PUBLICATIONS

English-language translation of CN 103571546A (Year: 2014).*
Guandian, "Scroller" Manual of Organic Preparation of Chemistry, Organic Synthesis vol. 48 (1960).
Yuandong, et al. "Effect of organic solvents and water content in feed oil on the transesterification" China Oils and Fats, 2011, vol. 36, No. 12.

* cited by examiner

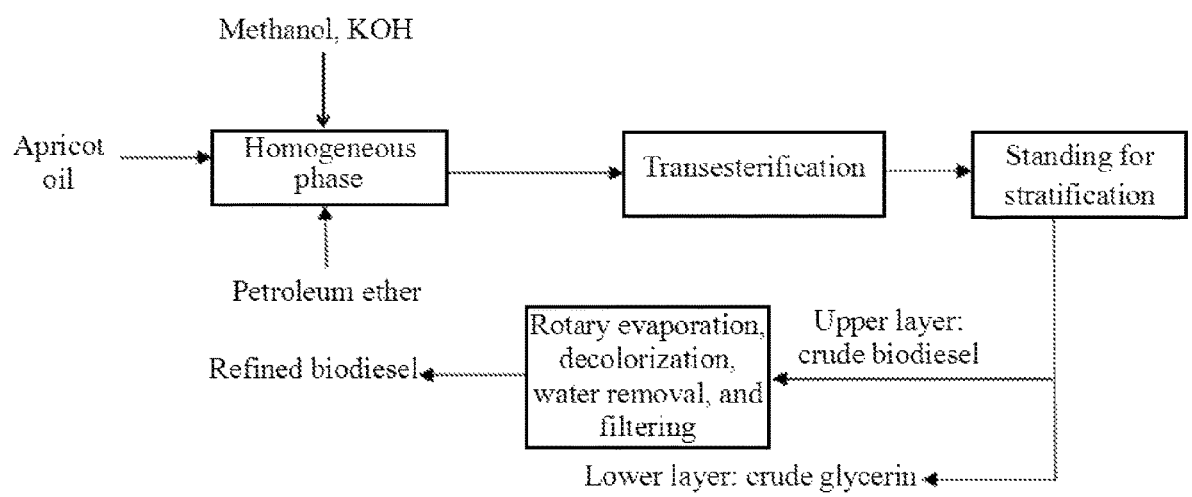

METHOD FOR RAPIDLY PREPARING BIODIESEL UNDER LOW TEMPERATURES

CROSS-REFERENCE TO RELATED APPLICATIONS

This application claims priority to Chinese Patent Application No. 202210433337.6, filed on Apr. 24, 2022, the contents of which are hereby incorporated by reference.

TECHNICAL FIELD

The present application belongs to the technical field of chemical energy, and specifically relates to a method for rapidly preparing biodiesel under low temperatures.

BACKGROUND

Exploitable sources of fossil energy such as coal and petroleum are depleting on the earth, and energy shortage and environmental pollution caused by burning fossil fuels will plague the development of human society for a long time. Biodiesel, as one of the new type of fuels developed, is considered as an excellent substitute for fossil diesel to reduce the emission of greenhouse gases and pollutants. It is developed by using renewable vegetable oil, animal fat or waste cooking oil as raw materials, and then transesterified with methanol under the action of catalyst, allowing for the direct replacement or blending with fossil diesels with the characteristics of biodegradability, renewable, high flash point, high lubricity and high cetane level.

Transesterification is routinely used as a common technology to prepare biodiesel, including using alkali catalysts, acid catalysts or enzymes as catalysts, and using vegetable oils or waste fats to react with methanol or ethanol at temperatures (between 60-200 degree Celsius (° C.)), where different temperatures are required for the reaction according to the catalysts used. For instance, sodium hydroxide, potassium hydroxide, metal oxides, etc. are usually used as alkali catalyst, and the reaction temperature is usually between 60-90° C. with biodiesel yield above 80 percent (%); acid catalyst usually includes sulfonic acid, heteropoly acid, super acid, metal oxide type solid acid and acidic ionic liquid catalysts, etc., where the required reaction temperature for the transesterification is relatively high, usually above 80° C.; some scholars use the solid acid catalyst of $SO_4^{2-}/ZrO_2$ as a catalyst to prepare biodiesel from palm oil, with a reaction temperature of 200° C. and a biodiesel yield of more than 85%; bioenzyme is a new type of catalyst for biodiesel preparation, and the obtained biodiesel is easy to collect and the catalyst is more economical compared with other catalysts; yet, alcohol can be toxic to the enzyme and affect the enzyme activity, or even inactivate the enzyme, and the application of bioenzyme catalysis in industrialization is greatly limited by the high cost of the bioenzyme.

In conclusion, catalysts play an extremely important role in preparing biodiesel. New catalyst with high efficiency and high reliability, low cost and easy preparation is currently a hot topic of interest for scholars worldwide. In addition to increase the reaction velocity as a catalyst, solid catalysts are easier to be separated from the reaction medium, easy to be recycled and regenerated; nevertheless, problems still exist in that catalysts fundamentally do not reduce the temperature required for the transesterification, poor compatibility of oils and alcohols, high energy consumption of the reaction and high cost of biodiesel preparation.

SUMMARY

To solve the above problems in the prior art, the present application provides a method for preparing biodiesel under low temperatures; during transesterification, organic solvent is added to improve the compatibility of alcohol and grease, reduce the energy consumption of the reaction, and therefore realize the preparation of biodiesel at no more than 36 degree Celsius (° C.) with a yield of 85 percent (%) or more.

To achieve the above objectives, the present application provides the following technical schemes:

a method for rapidly preparing biodiesel under low temperatures, including steps of: adding an alkali catalyst, an alcohol and an organic solvent into grease, and obtaining the biodiesel through transesterification.

The organic solvent is petroleum ether and/or n-hexane, and the transesterification is carried out under temperature of 20-40° C.

Optionally, the grease is a vegetable oil, and the vegetable oil includes apricot oil and/or *Xanthoceras sorbifolia* oil.

Optionally, the alkali catalyst includes potassium hydroxide, sodium hydroxide, potassium salt or sodium salt of alkaline aqueous solution.

Optionally, the alcohol includes methanol and/or ethanol.

Optionally, the petroleum ether has a boiling range of 60 to 90° C.

Optionally, the alkali catalyst is used in an amount of 0.5 to 2.5 weight percentage (wt %) of the grease.

Optionally, the alcohol is in a molar ratio of (3-12):1 to the grease.

Optionally, the alcohol to the organic solvent is 1:(1-3) in molar ratio.

Optionally, the transesterification is lasted for a duration of 20-60 minutes (min).

Optionally, the transesterification is followed by standing the biodiesel for stratification, and performing rotary evaporation to an upper crude biodiesel so as to obtain a refined biodiesel.

Compared with the prior art, the present application has the following beneficial effects:

in the present application, the organic solvent petroleum ether or n-hexane is added during the transesterification, so that the compatibility between the two phases of alcohol and grease is greatly enhanced, with increased contact area between the two phases of alcohol and grease, and reduced mass transfer resistance between the two phases of alcohol and grease, so that the grease molecules are promoted to enter the methanol solution and the oil in the grease can be dissolved into the alcohol quickly, therefore, the transesterification takes place at a lower temperature under the action of the alkali catalyst, and the biodiesel with higher yield is obtained in a shorter time;

with the addition of organic solvent petroleum ether or n-hexane into the transesterification, as well as improved compatibility between alcohol and grease, the energy consumption of the reaction is reduced, and biodiesel is quickly prepared at no more than 36° C., with a biodiesel yield of more than 80%; the significance of this application is even more practical at a time when low-carbon economy and energy conservation and emission reduction are advocated; and with no adoption of new type solid catalysts, the present application saves the cost of preparing new type of catalysts with simple process; under conventional transesterification conditions, the temperature and time required for transesterification may be greatly reduced by adding only the appropriate amount of organic solvent n-hexane or petroleum ether, and the energy consumption of biodiesel production is reduced, with a guaranteed biodiesel yield of more than 80%; the present application shatters the common thinking in the industry that biodiesel must be at high temperature for transesterification, and the method of preparing biodiesel of this application is scientific and environmental friendly, by which the obtained biodiesel is in line with the Chinese national standards.

BRIEF DESCRIPTION OF THE DRAWING

For a clearer description of the technical schemes in the embodiments or prior art of the present application, the following drawings are briefly described for use in the embodiments, and it is obvious that the drawings in the following description are only some embodiments of the present application, and that other drawings are available to those of ordinary skill in the art without creative efforts.

FIG. 1 shows a process of preparing biodiesel according to Embodiment 1.

DETAILED DESCRIPTION OF THE EMBODIMENTS

A number of exemplary embodiments of the present application is now described in detail, and this detailed description should not be considered as a limitation of the present application, but should be understood as a more detailed description of certain aspects, characteristics and embodiments of the present application. It should be understood that the terminology described in the present application is only for describing specific embodiments and is not used to limit the present application.

In addition, for the numerical range in the present application, it should be understood that each intermediate value between the upper limit and the lower limit of the range is also specifically disclosed. The intermediate value within any stated value or stated range and every smaller range between any other stated value or intermediate value within the stated range are also included in the present application. The upper and lower limits of these smaller ranges may be independently included or excluded from the range.

Unless otherwise specified, all technical and scientific terms used herein have the same meaning as commonly understood by one of ordinary skill in the art to which this application relates. Although the present application only describes the preferred methods and materials, any methods and materials similar or equivalent to those described herein may also be used in the practice or testing of the present application. All documents mentioned in this specification are incorporated by reference to disclose and describe the methods and/or materials related to the documents. In case of conflict with any incorporated document, the contents of this specification shall prevail.

It is obvious to those skilled in the art that many improvements and changes can be made to the specific embodiments of the present application without departing from the scope or spirit of the present application. Other embodiments will be apparent to the skilled person from the description of the application. The description and embodiment of the present application are only exemplary.

The terms "including", "comprising", "having" and "containing" used in this article are all open terms, which means including but not limited to.

In the following embodiments and comparative embodiments, the apricot oil extracted by ultrasonic method has a density of 0.9207 gram per milliliter (g/mL) and an amount of substance concentration of 1.04 moles per liter (mol/L); the density of *Xanthoceras sorbifolia* oil extracted by ultrasonic method is 0.8486 g/mL, and the amount of substance concentration is 0.8 mol/L; the amount of substance concentration of the petroleum ether with boiling range of 60-90° C. is 7.55 mol/L, that of petroleum ether with boiling range of 30-60° C. is 9.03 mol/L, and that of petroleum ether with boiling range of 90-120° C. is 6.50 mol/L; the densities of methanol solution and ethanol solution are 0.792 gram per square centimeter (g/cm$^3$) and 0.65 g/cm$^3$, respectively.

The description will not be repeated below.

Embodiment 1

The following raw materials are used to prepare biodiesel, including:

20 mL of apricot oil extracted by ultrasonic method, KOH with a mass of 1 weight percentage (wt %) of the apricot oil, methanol with a molar ratio of 7:1 to the apricot oil, and petroleum ether with a molar ratio of 2:1 to the methanol and a boiling range of 60-90° C.; and the biodiesel is prepared as follows: the transesterification is carried out in a 100 mL round bottom three-necked bottle equipped with a condenser, and it is magnetically stirred at a rotating speed of 600 revolutions per minute (rpm), with reaction temperature being controlled by water bath heating; then the apricot oil extracted by ultrasonic method and the organic solvent petroleum ether (boiling range of 60-90° C.) are put into the three-necked bottle; potassium hydroxide is dissolved in a methanol solution, and the methanol solution dissolved with potassium hydroxide is poured into the three-necked bottle; the reaction temperature is controlled at 36° C. and the reaction duration is 60 min; after the reaction, the product is left standing and layered, with crude biodiesel in the upper layer and crude glycerin in the lower layer; the upper layer of crude biodiesel is treated by a rotary evaporator to remove excess methanol and petroleum ether, then decolorized with 5% of the crude biodiesel mass of activated carbon derived from the seed shells of the *Xanthoceras sorbifolia*, and washed with distilled water for 3 times, followed by the removal of residual water with anhydrous sodium sulfate to obtain refined biodiesel with a yield of 86.78%.

See FIG. 1 for the preparing process of the present embodiment.

Embodiment 2

The biodiesel is prepared from the following raw materials:

20 mL of mixed oil of apricot oil extracted by ultrasonic method and *Xanthoceras sorbifolia* oil extracted by ultrasonic method (mixed at a volume ratio of 1:1), KOH with a mass of 2.5 wt % of the mixed oil, methanol with a molar ratio of 8:1 to the mixed oil, and petroleum ether with a molar ratio of 1:1 to the methanol and a boiling range of 60-90° C.; and the biodiesel is prepared as follows: the transesterification is carried out in a 100 mL round bottom three-necked bottle equipped with a condenser, and it is magnetically stirred at a rotating speed of 600 rpm, with reaction temperature being controlled by water bath heating;

then the mixed oil extracted by ultrasonic method and the organic solvent petroleum ether are put into the three-necked bottle; potassium hydroxide is dissolved in a methanol solution, and the methanol solution dissolved with potassium hydroxide is poured into the three-necked bottle; the reaction temperature is controlled at 20° C. and the reaction duration is 60 min; after the reaction, the product is left standing and layered, with crude biodiesel in the upper layer and crude glycerin in the lower layer; the upper layer of crude biodiesel is treated by a rotary evaporator to remove excess methanol and petroleum ether, then decolorized with 5% of the crude biodiesel mass of activated carbon derived from the seed shells of the *Xanthoceras sorbifolia*, and washed with distilled water for 3 times, followed by the removal of residual water with anhydrous sodium sulfate to obtain refined biodiesel with a yield of 89.57%.

Embodiment 3

The following raw materials are used to prepare biodiesel, including:
20 mL of apricot oil extracted by ultrasonic method, KOH with a mass of 0.5 wt % of the apricot oil, methanol with a molar ratio of 12:1 to the apricot oil, and petroleum ether with a molar ratio of 3:1 to the methanol and a boiling range of 60-90° C.; and
the biodiesel is prepared as follows: the transesterification is carried out in a 100 mL round bottom three-necked bottle equipped with a condenser, and it is magnetically stirred at a rotating speed of 600 rpm, with reaction temperature being controlled by water bath heating; then the apricot oil extracted by ultrasonic method and the organic solvent petroleum ether (boiling range of 60-90° C.) are put into the three-necked bottle; potassium hydroxide is dissolved in a methanol solution, and the methanol solution dissolved with potassium hydroxide is poured into the three-necked bottle; the reaction temperature is controlled at 40° C. and the reaction duration is 30 min; after the reaction, the product is left standing and layered, with crude biodiesel in the upper layer and crude glycerin in the lower layer; the upper layer of crude biodiesel is treated by a rotary evaporator to remove excess methanol and petroleum ether, then decolorized with 5% of the crude biodiesel mass of activated carbon derived from the seed shells of the *Xanthoceras sorbifolia*, and washed with distilled water for 3 times, followed by the removal of residual water with anhydrous sodium sulfate to obtain refined biodiesel with a yield of 84.35%.

Embodiment 4

The following raw materials are used to prepare biodiesel, including:
20 mL of *Xanthoceras sorbifolia* oil extracted by ultrasonic method, KOH with a mass of 1.5 wt % of the *Xanthoceras sorbifolia* oil, methanol with a molar ratio of 5:1 to the *Xanthoceras sorbifolia* oil, and petroleum ether with a molar ratio of 2:1 to the methanol and a boiling range of 60-90° C.; and
the biodiesel is prepared as follows: the transesterification is carried out in a 100 mL round bottom three-necked bottle equipped with a condenser, and it is magnetically stirred at a rotating speed of 600 rpm, with reaction temperature being controlled by water bath heating; then the *Xanthoceras sorbifolia* oil extracted by ultrasonic method and the organic solvent petroleum ether (boiling range of 60-90° C.) are put into the three-necked bottle; potassium hydroxide is dissolved in a methanol solution, and the methanol solution dissolved with potassium hydroxide is poured into the three-necked bottle; the reaction temperature is controlled at 30° C. and the reaction duration is 60 min; after the reaction, the product is left standing and layered, with crude biodiesel in the upper layer and crude glycerin in the lower layer; the upper layer of crude biodiesel is treated by a rotary evaporator to remove excess methanol and petroleum ether, then decolorized with 5% of the crude biodiesel mass of activated carbon derived from the seed shells of the *Xanthoceras sorbifolia*, and washed with distilled water for 3 times, followed by the removal of residual water with anhydrous sodium sulfate to obtain refined biodiesel with a yield of 82.65%.

Embodiment 5

20 mL of apricot oil extracted by ultrasonic method, KOH with a mass of 1.0 wt % of the apricot oil, methyl ethylene glycol (MEG) (methanol to ethanol in a molar ratio of 2.5:1) with a molar ratio of 5:1 to the apricot oil, and petroleum ether with a molar ratio of 1:1 to the methanol and a boiling range of 60-90° C.; and
the biodiesel is prepared as follows: the transesterification is carried out in a 100 mL round bottom three-necked bottle equipped with a condenser, and it is magnetically stirred at a rotating speed of 600 rpm, with reaction temperature being controlled by water bath heating; then the apricot oil extracted by ultrasonic method and the organic solvent petroleum ether (boiling range of 60-90° C.) are put into the three-necked bottle; potassium hydroxide is dissolved in a methanol solution, and the methanol solution dissolved with potassium hydroxide is poured into the three-necked bottle; the reaction temperature is controlled at 36° C. and the reaction duration is 60 min; after the reaction, the product is left standing and layered, with crude biodiesel in the upper layer and crude glycerin in the lower layer; the upper layer of crude biodiesel is treated by a rotary evaporator to remove excess methanol and petroleum ether, then decolorized with 5% of the crude biodiesel mass of activated carbon derived from the seed shells of the *Xanthoceras sorbifolia*, and washed with distilled water for 3 times, followed by the removal of residual water with anhydrous sodium sulfate to obtain refined biodiesel with a yield of 95.88%.

Comparative Embodiment 1

Same as Embodiment 1, except that the organic solvent petroleum ether is not added in the transesterification.
It is verified in this comparative embodiment that the transesterification is failed at 36° C. due to the absence of the organic solvent petroleum ether, and ultimately the biodiesel is not prepared.

Comparative Embodiment 2

Same as Embodiment 2, except that no n-hexane, the organic solvent, is added in the transesterification.

The absence of the organic solvent n-hexane in this comparative embodiment proves that the transesterification fails to proceed at 20° C., and ultimately the biodiesel cannot be prepared.

Comparative Embodiment 3

The difference from Embodiment 3 is that the petroleum ether is replaced with a petroleum ether with a boiling range of 30 to 60° C.

The yield of refined biodiesel prepared in this comparative embodiment is 68.7%.

Comparative Embodiment 4

Same as Embodiment 3, except that petroleum ether is replaced with petroleum ether with boiling range of 90-120° C.

The yield of refined biodiesel prepared in this comparative embodiment is 70.1%.

Comparative Embodiment 5

Same as Embodiment 2, except that n-hexane is replaced with n-octane.

The yield of the refined biodiesel obtained from this comparative embodiment is verified to be 72.5%.

It can be seen from Embodiment 3, Comparative embodiment 3 and Comparative embodiment 4 that not all kinds of petroleum ethers can promote the transesterification well at low temperatures, and only petroleum ethers with boiling range of 60-90° C. have better promotion efficiency; as shown in Embodiment 2 and Comparative embodiment 5, n-hexane enables the transesterification to proceed efficiently at low temperatures well, while the effect of similar solvent n-octane is significantly lower than that of n-hexane.

The performance tests on the biodiesels prepared in Embodiments 1 to 5 are shown in Table 1, and all of them meet the Chinese biodiesel standards.

TABLE 1

| Group | Flash point/° C. (opening) | Acid value/(mg KOH/g) | Cold filter plugging point/° C. | Cetane level | Sulfur element/ (mg/kg) |
| --- | --- | --- | --- | --- | --- |
| Embodiment 1 | 177 | 0.33 | 0 | 50.2 | 27.7 |
| Embodiment 2 | 171 | 0.52 | 4 | 47.2 | 18.9 |
| Embodiment 3 | 176 | 0.31 | 0 | 49.8 | 27.1 |
| Embodiment 4 | 175 | 0.24 | 2 | 44.7 | 35.4 |
| Embodiment 5 | 177 | 0.32 | 1 | 49.2 | 26.7 |

The above are only the preferred embodiments of the present application, and the scope of protection of the present application is not limited thereto. Any equivalent substitution or change made by any person familiar with the technical field according to the technical scheme and inventive concept of the present application within the technical scope disclosed by the present application should be covered in the scope of protection of the present application.

What is claimed is:

1. A method for rapid preparing biodiesel at low temperatures, consisting of: adding an alkali catalyst, an alcohol and an organic solvent into apricot oil and/or *Xanthoceras sorbifolia* oil, and obtaining the biodiesel through transesterification;
   wherein the organic solvent is at least one of petroleum ether and n-hexane, and the transesterification is carried out under temperatures of 20-40 degree Celsius (° C.) for a duration of 20-60 minutes (min) followed by standing the biodiesel for stratification, and performing rotary evaporation to an upper crude biodiesel so as to obtain a refined biodiesel.

2. The method for rapid preparing biodiesel at low temperatures according to claim 1, wherein the alkali catalyst comprises at least one of potassium hydroxide, sodium hydroxide, or a salt derived from potassium hydroxide or sodium hydroxide dissolved in an alkaline aqueous solution.

3. The method for rapid preparing biodiesel at low temperatures according to claim 1, wherein the alcohol comprises at least one of methanol and ethanol.

4. The method for rapid preparing biodiesel at low temperatures according to claim 1, wherein the petroleum ether has a boiling range of 60 to 90° C.

5. The method for rapid preparing biodiesel at low temperatures according to claim 1, wherein the alkali catalyst is used in an amount of 0.5 to 2.5 weight percentage (wt %) of the oil.

6. The method for rapid preparing biodiesel at low temperatures according to claim 1, wherein the alcohol is in a molar ratio of (3-12):1 to the oil.

7. The method for rapid preparing biodiesel at low temperatures according to claim 1, wherein the alcohol to the organic solvent is 1:(1-3) in a molar ratio.

* * * * *